(12) United States Patent
Mori et al.

(10) Patent No.: US 6,447,618 B1
(45) Date of Patent: *Sep. 10, 2002

(54) MAGNETIC ACICULAR ALLOY PARTICLES CONTAINING IRON AS A MAIN COMPONENT

(75) Inventors: Kohji Mori, Onoda; Yasutaka Ota, Hiroshima, both of (JP)

(73) Assignee: Toda Kogyo Corporation, Hiroshima-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/361,112

(22) Filed: Jul. 27, 1999

(30) Foreign Application Priority Data

Jul. 31, 1998 (JP) .......................... 10-218041

(51) Int. Cl.$^7$ ................................. H01F 1/03
(52) U.S. Cl. ................. 148/105; 252/62.55; 75/348; 428/694 BA
(58) Field of Search .................. 148/105; 75/348–351; 428/402, 694 B, 694 BA; 106/403, 404, 456, 459, 460, 480; 252/62.55, 62.56, 62.57, 62.58, 62.62, 62.63; 423/632–634

(56) References Cited

U.S. PATENT DOCUMENTS 5,534,361 A * 7/1996 Hisano et al. ........ 428/694 RE
5,591,535 A * 1/1997 Hisano et al. ........ 428/694 RE
5,735,969 A   4/1998 Lown et al.

FOREIGN PATENT DOCUMENTS

| JP | 61-270315 |   | 11/1986 |
| JP | 62-17101  |   | 1/1987  |
| JP | 62-156202 |   | 7/1987  |
| JP | 63-88806  | * | 4/1988  |
| JP | 3-101103  |   | 4/1991  |
| JP | 6-29112   |   | 2/1994  |
| JP | 7-22224   | * | 1/1995  |

OTHER PUBLICATIONS

English Translation of Japanese Kokai: 63–88805 (1988).*
English Translation of Japanese Kokai: 7–22224 (1995).*
Derwent Account No. 1995–038704 (Dowa Mining Co. LTD, JP 07022224, Jan. 1995).*
Derwent Account No. 1988–14522 (Mitsui Toatsu Chem. Inc., JP 63088806 A, Apr. 1988).*

* cited by examiner

Primary Examiner—Stevan A. Resan
Assistant Examiner—Kevin Bernatz
(74) Attorney, Agent, or Firm—Nixon & Vanderhye P.C.

(57) ABSTRACT

Magnetic acicular alloy particles containing iron as a main component according to the present invention, have an average major axial diameter of 0.05 to 0.2 μm, and pH values of water suspensions of said magnetic acicular alloy particles containing iron as a main component, which satisfies the formula:

(pH value of water suspension treated by A method)–(pH value of water suspension treated by B method)<0

Such magnetic acicular alloy particles containing iron as a main component exhibit an excellent dispersibility in a vehicle, especially such a vehicle composed of a binder resin having a polar group such as —SO$_3$M (wherein M is H, Na or K), —COOH or the like, and in which an orientation and a packing density in coating film are improved.

12 Claims, No Drawings

MAGNETIC ACICULAR ALLOY PARTICLES CONTAINING IRON AS A MAIN COMPONENT

BACKGROUND OF THE INVENTION

The present invention relates to magnetic acicular alloy particles containing iron as a main component, and more particularly, to magnetic acicular alloy particles containing iron as a main component which exhibit an excellent dispersibility in a vehicle, especially such a vehicle composed of a binder resin having a polar functional group such as —$SO_3M$ (wherein M is H, Na or K), —COOH or the like, and in which an orientation and a packing density in coating film are improved; and a magnetic recording medium using the magnetic acicular alloy particles containing iron as a main component.

In recent years, recording-time prolongation, the miniaturization and lightening of magnetic recording and reproducing apparatuses for audio or video have proceeded more rapidly. In particular, VTRs (video tape recorders) are now widespread, so that there have been intensely developed VTRs aiming at prolongation of the recording-time, miniaturization and lightening of the VTRs.

On the other hand, magnetic recording media such as magnetic tapes have been required to have a still higher performance and a still higher recording density.

More specifically, magnetic recording media have been required to show a high image quality, high output characteristics, and especially high frequency characteristics. For this reason, it has been strongly demanded to enhance an S/N ratio of magnetic recording media.

These characteristics of the magnetic recording media have a close relation to the magnetic particles used therefor. In recent years, magnetic acicular alloy particles containing iron as a main component have been used as magnetic particles for magnetic recording media such as digital audio tapes (DAT), 8-mm video tapes, Hi-8 tapes, video floppy or the like, because such particles can show a high coercive force and a large saturation magnetization as compared to those of the conventional magnetic iron oxide particles.

In magnetic recording fields, there has been a continuous demand for the enhancement of these characteristics. In particular, it has been strongly demanded to further improve properties of the magnetic acicular alloy particles containing iron as a main component, which have a considerable influence on the characteristics of magnetic recording media such as S/N ratio or the like.

Namely, it has now been strongly required to provide magnetic acicular alloy particles containing iron as a main component, which show an excellent dispersibility in vehicle, and in which an orientation and a packing density in coating film are improved, and to improve properties of the magnetic acicular alloy particles themselves.

In order to attain the excellent dispersibility in vehicle, and the enhanced orientation and packing density in coating film, there have been widely proposed a method of improving surface conditions of the magnetic acicular alloy particles containing iron as a main component by using various organic or inorganic compounds, or a method of using binder resins having a polar functional group such as —$SO_3M$, —COOH or the like.

In order to satisfy the requirements for improving the properties of the magnetic acicular alloy particles themselves, there have been conducted various attempts not only for reducing the size of the magnetic acicular alloy particles containing iron as a main component, but also for enhancing the shape-maintaining property and the aspect ratio (major axial diameter/minor axial diameter) which tend to be deteriorated in association with the size reduction. In addition, it has been attempted to improve magnetic properties of these magnetic acicular alloy particles containing iron as a main component. In order to obtain magnetic acicular alloy particles containing iron as a main component, which have the above-mentioned excellent properties, it is necessary that acicular goethite particles used as a starting material are fine particles having a large aspect ratio and a narrow particle size distribution.

In addition, it is important that in the production of the magnetic acicular alloy particles, the particle shape of the raw acicular goethite particles is retained as similarly as possible. In order to allow the magnetic acicular alloy particles to inherit the particle shape of the raw acicular goethite particles, it has been attempted to coat the surfaces of the acicular goethite particles or acicular hematite particles obtained by heat-dehydrating the acicular goethite particles, with various inorganic or organic compounds in advance of the heat-reduction thereof.

As well known in the arts, the size reduction of the magnetic acicular alloy particles containing iron as a main component adversely affects the orientation and packing density in coating film. In addition, as a matter of course, various inorganic compounds coated on the surfaces of the acicular goethite particles or the acicular hematite particles still remains on the surfaces of the magnetic acicular alloy particles containing iron as a main component, which are obtained by subjecting the acicular goethite particles or the acicular hematite particles to heat-reduction, or are diffused thereinto, thereby deteriorating the surface conditions of the magnetic acicular alloy particles containing iron as a main component. As a result, the conformability or compatibility of the particles with binder resin is considerably deteriorated.

Therefore, the magnetic acicular alloy particles containing iron as a main component have been strongly required to show an enhanced dispersibility in vehicle, high orientation and packing density in coating film, without being adversely influenced by the size reduction or the surface conditions thereof.

Hitherto, in order to improve various properties of the magnetic acicular alloy particles containing iron as a main component, such as dispersibility in vehicle, oxidation stability or the like, there is known such a method of contacting the magnetic acicular alloy particles containing iron as a main component with a basic gas such as ammonia, at various stages of the production process thereof, e.g., at a stage immediately after the heat-reduction and before allowing any oxide layer to be formed on the surfaces of the magnetic acicular alloy particles containing iron as a main component, at a gradual oxidation stage after the heat-reduction, or at a stage where the oxide layer is already formed on the surfaces of the particles by gradual oxidation (Japanese Patent Application Laid-Open (KOKAI) Nos. 49-89899(1974), 49-99004(1974), 51-51796 (1976) and 51-63494 (1976), Japanese Patent Publication (KOKOKU) No. 55-4802 (1980), Japanese Patent Application Laid-Open (KOKAI) Nos. 61-270315 (1986), 62-156202 (1987), 63-88806 (1988) and 3-101103(1991), Japanese Patent Publication (KOKOKU) No. 5-57321 (1993), Japanese Patent Application Laid-Open (KOKAI) No. 6-29112 (1994), etc.).

Thus, at the present time, it has been most strongly demanded to provide magnetic acicular alloy particles containing iron as a main component, which show an excellent dispersibility in vehicle, and in which a high orientation and a high packing density in coating film are improved, without being adversely affected by the size reduction or surface conditions thereof. However, the above-mentioned conventional methods fail to sufficiently satisfy these requirements.

Specifically, in the case of the particles described in Japanese Patent Application Laid-Open (KOKAI) Nos. 49-89899 (1974), 49-99004 (1974), 51-51796 (1976) and 51-63494 (1976), Japanese Patent Publication (KOKOKU) No. 55-4802 (1980), Japanese Patent Application Laid-Open (KOKAI) Nos. 61-270315 (1986), 62-156202 (1987), 63-88806 (1988) and 3-101103 (1991), Japanese Patent Publication (KOKOKU) No. 5-57321 (1993), Japanese Patent Application Laid-Open (KOKAI) No. 6-29112 (1994), etc., the difference between pH values of the water suspensions containing these particles as described hereinafter, is not less than 0. In particular, in the case of the particles described in Japanese Patent Application Laid-Open (KOKAI) No. 63-88806 (1988), the difference between pH values of the water suspensions is equal to zero as shown in Comparative Example 7 below, and the dispersibility in vehicle and the orientation and packing density in coating film are still unsatisfactory.

As a result of the present inventors' earnest studies, it has been found that magnetic acicular alloy particles containing iron as a main component, which show that the difference between pH values of two water suspensions thereof respectively treated by a boiling method (A method) and an ordinary temperature method (B method) according to JIS K 5101-1991, is less than 0 [i.e., (pH value of water suspension treated by A method)–(pH value of water suspension treated by B method)<0], and which have an average major axial diameter of 0.05 to 0.2 $\mu$m, can show an excellent dispersibility in vehicle, and can exhibit enhanced orientation and packing density in coating film. The present invention has been attained on the basis of the finding.

SUMMARY OF THE INVENTION

It is an object of the present invention to provide magnetic acicular alloy particles containing iron as a main component, which can show an excellent dispersibility in vehicle, and exhibit enhanced orientation and packing density in coating film, without being adversely influenced by the reduction of the particle size and surface conditions thereof.

To accomplish the aims, in a first aspect of the present invention, there are provided magnetic acicular alloy particles containing iron as a main component, which have an average major axial diameter of 0.05 to 0.2 $\mu$m, and the difference between pH values of water suspensions of the magnetic acicular alloy particles containing iron as a main component, which is represented by the formula:

(pH value of water suspension treated by A method)–(pH value of water suspension treated by B method)<0 wherein the A method comprises:
placing 5 g of the magnetic acicular alloy particles containing iron as a main component in a hard conical flask;
adding 100 ml of water into the flask;
after heating to boiling for 5 minutes, boiling the content of the flask for 5 minutes;
compensating a reduced amount of water in the flask by adding thereto water which is previously boiled to remove a carbon dioxide gas therefrom; and
after plugging the flask, allowing the content of the flask to stand for cooling to room temperature, and the B method comprises:
placing 5 g of the magnetic acicular alloy particles containing iron as a main component in a hard conical flask;
adding 100 ml of water which is previously boiled to remove a carbon dioxide gas therefrom, into the flask; and
after plugging the flask, shaking the content of the flask for 5 minutes, and
the pH values of the water suspensions respectively treated by the A and B methods are measured by a pH meter.

In a second aspect of the present invention, there is provided a magnetic recording medium comprising:
a non-magnetic substrate; and
a magnetic layer formed on the substrate, comprising a binder resin and the magnetic acicular alloy particles containing iron as a main component set forth in the first aspect.

DETAILED DESCRIPTION OF THE INVENTION

First, the magnetic acicular alloy particles containing iron as a main component according to the present invention are explained.

The magnetic acicular alloy particles containing iron as a main component according to the present invention, contain iron in an amount of usually not less than 50% by weight, preferably 50 to 95% by weight, more preferably 60 to 90% by weight based on the weight of the particles, and may optionally contain at least one of other elements such as Al, Co, Ni, P, Si, B, rare earth elements or the like, if desired. These optional elements may be contained in an amount of usually less than 50% by weight, preferably not less than 5% by weight and less than 50% by weight, more preferably 10 to 40% by weight based on the weight of the particles. Further, in the consideration of good shape-maintaining property accompanied by the size reduction of the particles, large aspect ratio (major axial diameter/minor axial diameter) and high magnetic properties, it is preferred that the magnetic acicular alloy particles containing iron as a main component are composed of iron and aluminum, cobalt and/or a rare earth element.

The content of Al is preferably 0.1 to 30 mol % based on the total content of metal elements in the magnetic acicular alloy particles containing iron as a main component. When the content of Al is less than 0.1 mol %, the sintering-prevention effect upon heat-reduction of the starting particles may be insufficient, so that it may become difficult to inherit the shape of the starting particles. As a result, the obtained magnetic acicular alloy particles containing iron as a main component fail to show the aimed particle shape and, therefore, an appropriate aspect ratio. On the other hand, when the content of Al is more than 30 mol %, the heat-reduction of the starting particles may be inhibited from proceeding, and it may become difficult to obtain magnetic acicular alloy particles containing iron as a main component, which have a large saturation magnetization ($\sigma$s), because of the increase in amounts of components which do not contribute to improvements in magnetic properties thereof.

Cobalt is an element suited for enhancing various properties of the obtained particles such as saturation magnetization, oxidation stability, coercive force distribution (Switching Field Distribution: SFD) or the like. The content of Co is preferably 0.5 to 35 mol % based on the total content of metal elements in the magnetic acicular alloy particles containing iron as a main component.

The content of rare earth element is preferably 0.1 to 10 mol % based on the total content of metal elements in the magnetic acicular alloy particles containing iron as a main component. When the content of rare earth element is less than 0.1 mol %, the sintering-prevention effect upon the heat-reduction of the starting particles may be insufficient, so that it may become difficult to inherit the shape of the starting particles. As a result, the obtained magnetic acicular alloy particles containing iron as a main component fail to show the aimed particle shape and, therefore, an appropriate aspect ratio. On the other hand, when the content of rare earth element is more than 10 mol %, the heat reduction of the starting particles may be inhibited from proceeding, and it may become difficult to obtain magnetic acicular alloy particles containing iron as a main component, which have a large saturation magnetization ($\sigma s$), because of the increase in amounts of components which do not contribute to improvements in magnetic properties thereof. From the standpoint of industrial applicability, the use of relatively inexpensive Nd, Y, La and Sm is preferable.

The magnetic acicular alloy particles containing iron as a main component, have an average major axial diameter of usually 0.05 to 0.2 $\mu$m, preferably 0.08 to 0.18 $\mu$m, and an aspect ratio of preferably not less than 3:1, more preferably not less than 6:1. In the consideration of the dispersibility in vehicle, the upper limit of the aspect ratio is preferably 20:1, more preferably 15:1.

The magnetic acicular alloy particles containing iron as a main component according to the present invention may have an acicular shape including spindle, rice-ball, acicular or the like. However, among them, the spindle-shaped particles which have a uniform particle size distribution and are free from the inclusion of dendritic particles, are preferred. The spindle-shaped particles have a major axial diameter distribution of preferably not more than 0.4, more preferably not more than 0.35. The lower limit of the major axial diameter distribution is preferably 0.1.

The magnetic acicular alloy particles containing iron as a main component according to the present invention can be produced by using as starting particles, such spindle-shaped particles which have a uniform particle size distribution and are free from the inclusion of dendritic particles, and which are obtained by reacting a aqueous ferrous salt solution with either an aqueous alkali carbonate solution or both an aqueous alkali hydroxide solution and an aqueous alkali carbonate solution.

As to the magnetic properties of the magnetic acicular alloy particles containing iron as a main component according to the present invention, in the consideration of various properties of the obtained magnetic recording media such as high-density recording or the like, the coercive force thereof is preferably 1,400 to 2,500 Oe, more preferably 1,500 to 2,500 Oe; and the saturation magnetization thereof is preferably 100 to 170 emu/g, more preferably 120 to 160 emu/g.

In the magnetic acicular alloy particles containing iron as a main component according to the present invention, it is important that the pH values of water suspensions thereof respectively treated by A and B methods as described in the pH-measuring method according to JIS K5101-1991, can satisfy such a relationship as represented by the formula:

[pH value of water suspension treated by the A method (boiling method)]−[pH value of water suspension treated by the B method (ordinary temperature method)]<0, when the pH values are measured by a pH-measuring method according to JIS Z 8802. The difference value of {(pH value of water suspension treated by A method)−(pH value of water suspension treated by B method)} (hereinafter referred to as merely "difference between pH values") is preferably not more than −0.1, more preferably not more than −0.2. The lower limit of the difference between pH values is preferably −0.5, more preferably −0.4.

When the difference between pH values is not less than 0, it is not possible to obtain the aimed magnetic acicular alloy particles containing iron as a main component, which can show an excellent dispersibility in vehicle, and can show enhanced orientation and packing density in coating film.

It is preferred that the content of ammoniacal nitrogen in the magnetic acicular alloy particles containing iron as a main component according to the present invention, is 30 to 800 ppm, more preferably 30 to 500 ppm. When the content of ammoniacal nitrogen is less than 30 ppm, the pH value of the water suspension treated by the B method (hereinafter referred to merely as "ordinary temperature method") may be insufficiently high, so that the difference between pH values may tend to be not less than 0. On the other hand, when the content of ammoniacal nitrogen is more than 800 ppm, the pH value of the water suspension treated by the ordinary temperature method is sufficiently high, so that the difference between pH values tends to be less than 0. However, in this case, the aimed effects of the present invention are already saturated or reduced and, therefore, the use of such a large amount of ammoniacal nitrogen is unnecessary. Incidentally, the term of "ammoniacal nitrogen" means that measured by an ammonium ion-measuring method described in JIS K0102-1993.

It is preferred that the content of soluble salts such as soluble alkali metal salts such as Na salts, K salts or the like, or soluble alkali earth metal salts such as Ca salts, Mg salts or the like (hereinafter referred to merely as "soluble salts") in the magnetic acicular alloy particles containing iron as a main component according to the present invention, is not more than 800 ppm, when measured with respect to the water suspension thereof treated by the A method (hereinafter referred to as "boiling method"). When the content of the soluble salts is more than 800 ppm, the difference between pH values may tend to be not less than 0, because the pH value of the water suspension obtained by the boiling method becomes high. Further, when the particles containing an excess amount of the soluble salts are dispersed in vehicle, the salts are reacted with resins so as to form a compound, thereby causing disadvantages such as drop-out or the like. In order to obtain the aimed magnetic acicular alloy particles containing iron as a main component, it is preferred that the content of the soluble salts is not more than 500 ppm, more preferably not more than 400 ppm.

It is preferred that the content of the soluble alkali metal salt such as Na salts, K salts or the like in the magnetic acicular alloy particles containing iron as a main component according to the present invention, is not more than 500 ppm, when measured with respect to the water suspension thereof treated by the boiling method. When the content of the soluble alkali metal salt is more than 500 ppm, the difference between pH values may tend to be not less than 0, because the pH value of the water suspension obtained by the boiling method becomes high. Further, when the particles containing an excess amount of the soluble alkali metal salt are dispersed in vehicle, the salt is reacted with resins so as to form a compound, thereby causing disadvantages such as drop-out or the like. In order to obtain the aimed magnetic acicular alloy particles containing iron as a main component, the content of the soluble alkali metal salt is more preferably not more than 400 ppm, still more preferably not more than 300 ppm.

It is preferred that the content of the soluble alkali earth metal salt such as Ca salts, Mg salts or the like in the magnetic acicular alloy particles containing iron as a main component according to the present invention, is not more than 300 ppm, more preferably not more than 100 ppm, still more preferably not more than 80 ppm, when measured with respect to the water suspension thereof which is obtained by the boiling method. When the content of the soluble alkali earth metal salt is more than 300 ppm, the difference between pH values may tend to be not less than 0, because the pH value of the water suspension obtained by the boiling method becomes high. Further, when the particles containing an excess amount of the soluble alkali earth metal salt is dispersed in vehicle, the salt is reacted with resins so as to form a compound, thereby causing disadvantages such as drop-out or the like.

Next, the process for producing the magnetic acicular alloy particles containing iron as a main component according to the present invention, is explained.

In general, magnetic acicular alloy particles containing iron as a main component can be produced by heat-reducing acicular goethite particles obtained by passing an oxygen-containing gas such as air through a suspension containing an iron-containing precipitate which is obtained by reacting an aqueous ferrous salt solution with either an aqueous alkali hydroxide solution and/or an aqueous alkali carbonate solution, or acicular hematite particles obtained by subjecting the above acicular goethite particles to filtering-out, washing with water, drying and then heat-dehydrating, at a temperature of 300 to 700° C., thereby producing magnetic acicular alloy particles containing iron as a main component; and then gradually oxidizing the obtained magnetic acicular alloy particles while passing an oxygen-containing non-reducing gas therethrough, thereby forming an oxide layer on the surfaces thereof. In the above-mentioned general method for producing the magnetic acicular alloy particles containing iron as a main component, when the acicular goethite particles or the acicular hematite particles are subjected to various treatments such as washing with pure water, etc., so as to remove soluble salts such as soluble alkali metal salts such as Na salts, K salts or the like, or soluble alkali earth metal salts such as Ca salts, Mg salts or the like therefrom for reducing the contents of impurities, and further when the obtained particles are treated at a temperature of 60 to 180° C. under a wet non-reducing gas stream containing ammonia and oxygen at the gradual oxidation stage after the heat-reduction or any subsequent stage after completion of the gradual oxidation, it is possible to produce the magnetic acicular alloy particles containing iron as a main component according to the present invention. As the non-reducing gases, the use of nitrogen gas is preferable.

The acicular goethite particles or the acicular hematite particles have been ordinarily produced using sodium salts or potassium salts as a starting aqueous alkali hydroxide solution. In particular, most of these particles have been industrially produced using an aqueous sodium hydroxide solution as the aqueous alkali hydroxide solution, an aqueous sodium carbonate solution as the aqueous alkali carbonate solution, or the like. In this case, sodium salts derived from the aqueous alkali solution, or sodium salts derived from $Na_2SO_3$, etc., as by-product salts produced by the reaction between the aqueous ferrous salt solution and the aqueous alkali solution, are inevitably contained or retained within the obtained particles, on the surfaces thereof or between mutually entangled particles,.

Also, when a potassium salt is used as the starting aqueous alkali solution, the potassium salt is contained or retained within the particles, on the surfaces thereof or between mutually entangled particles. Most of these alkali metal salts such as Na salts or K salts can be removed by washing the acicular goethite particles produced from the aqueous solution, with water under ordinary conditions. However, the alkali metal salts which are still retained within the particles or between firmly entangled aggregate particles, cannot be readily removed only by washing with water. In such a case, the alkali metal salts such as Na salts or K salts are usually contained or retained in an amount of 600 to 2,000 ppm. These alkali metal salts incapable of being removed only by washing with water, are solubilized at a subsequent heat-dehydration step or heat-reduction step. For this reason, the obtained magnetic acicular alloy particles containing iron as a main component, tend to contain a large amount of soluble alkali metal salts.

Also, the acicular goethite particles or the acicular hematite particles tend to contain or retain alkali earth metal salts such as Ca salts or Mg salts resulting from impurities in the aqueous ferrous salt solution and water as starting materials, or in wash water, in an amount of usually 200 to 10,000 ppm. These alkali earth metal salts are also solubilized at a subsequent heat-dehydration step or heat-reduction step. For this reason, the obtained magnetic acicular alloy particles containing iron as a main component, tend to contain a large amount of soluble alkali earth metal salts.

The magnetic acicular alloy particles containing iron as a main component, which have a low soluble salt content, can be obtained, for example, by a method (i) of producing acicular goethite particles using starting materials having a low content of impurities, or a method (ii) of heat-dehydrating acicular goethite particles especially at a temperature of 300 to 800° C. and then washing the thus-obtained hematite particles with pure water, or the like. From the industrial and economical viewpoints, the method (ii) is more advantageous.

The introduction of ammoniacal nitrogen into the magnetic acicular alloy particles containing iron as a main component according to the present invention, can be accomplished by either a method of immersing the magnetic acicular alloy particles containing iron as a main component on the surfaces of which an oxide layer is formed, in ammonia and then drying the particles (immersion method), or a method of contacting the magnetic acicular alloy particles containing iron as a main component with an ammonia gas in a vapor phase (vapor-phase contact method). In the immersion method, water is used as a solvent, so that the coercive force and the saturation magnetization of the obtained particles may tend to be deteriorated under certain treating conditions. Therefore, the use of the vapor-phase contact method is more preferred.

In the case of the vapor-phase contact method, it is preferred that the ammonia gas be contacted with the particles in the course of the gradual oxidation after heat-reduction (i.e., from initiation to completion of the gradual oxidation). In particular, it is more preferable to use a non-reducing gas such as a nitrogen gas which contains water vapor at a concentration of not less than 0.1%, together with an oxygen gas and an ammonia gas.

Next, the magnetic recording medium using the magnetic acicular alloy particles containing iron as a main component according to the present invention, and the process for producing the magnetic recording medium, are explained.

The magnetic recording medium according to the present invention, comprises a non-magnetic substrate; a non-magnetic undercoat layer optionally formed on the non-magnetic substrate, which is obtained by applying thereon a non-magnetic coating material composed of non-magnetic particles, a binder resin and a solvent, and then drying the coat; and a magnetic recording layer formed on the surface of the non-magnetic substrate or the non-magnetic undercoat layer which is obtained by applying thereon a magnetic coating material composed of the magnetic acicular alloy particles containing iron as a main component, a binder resin and a solvent, and then drying the coat.

As the non-magnetic substrates, there may be exemplified those currently ordinarily used for magnetic recording media, e.g., synthetic resin films such as polyethylene terephthalate film, polyethylene film, polypropylene film, polycarbonates film, polyethylene naphthalate film, polyamides film, polyamide imides film, polyimides film or the like; metal foils or plates such as aluminum, stainless steel or the like; or various papers.

As to the blending ratio of the magnetic acicular alloy particles containing iron as a main component to the binder resin in the magnetic recording layer, the amount of the magnetic acicular alloy particles blended is usually 200 to 2,000 parts by weight, preferably 300 to 1,500 parts by weight based on 100 parts by weight of the binder resin.

The magnetic recording layer may further contain ordinarily used additives such as lubricants, abrasives, anti-static agents or the like.

As the binder resins, there may be exemplified those currently ordinarily used for the production of magnetic recording media such as vinyl chloride-vinyl acetate copolymers, urethane resins, vinyl chloride-vinyl acetate-maleic acid copolymers, urethane elastomers, butadiene-acrylonitrile copolymers, polyvinyl butyral, cellulose derivatives such as nitrocellulose, polyester resins; synthetic rubber-based resins such as polybutadiene, epoxy resins, polyamide resins, polyisocyanate, electron radiation-curable acrylic urethane resins; a mixture thereof; or the like. These binder resins may contain polar functional groups such as —COOH, —$SO_3M$ or the like. In particular, when the binder resins used contain —COOH or —$SO_3M$ as polar functional groups, it is possible to efficiently exhibit the aimed effects of the present invention, i.e., the dispersibility in vehicle, and the orientation and packing density in coating film can be remarkably improved.

Since the magnetic recording medium using the magnetic acicular alloy particles containing iron as a main component according to the present invention, has a gloss of usually not less than 160%, preferably not less than 170%, more preferably not less than 180%, it is recognized that the magnetic acicular alloy particles can show an excellent dispersibility in vehicle.

In addition, since the magnetic recording medium has a squareness of usually not less than 0.87, preferably not less than 0.88, it is recognized that the magnetic acicular alloy particles can show an enhanced orientation in coating film.

Further, since the magnetic recording medium has a remanence flux density (Br) of usually not less than 2,800 Gauss, preferably not less than 2,900 Gauss, more preferably not less than 3,000 Gauss, it is recognized that the magnetic acicular alloy particles can show an enhanced packing density in coating film.

The important point of the present invention lies in such a fact that when the difference between pH values of water suspensions containing the magnetic acicular alloy particles according to the present invention, which are respectively obtained by the above A and B methods, is not less than 0, the magnetic acicular alloy particles are deteriorated in dispersibility in vehicle, and cannot be improved in orientation and packing density in coating film.

As a result of studies concerning factors which have any influences on the difference between pH values, there has been obtained such a knowledge that the difference between the pH values is considerably influenced by the contents of ammoniacal nitrogen and soluble salts in the magnetic acicular alloy particles containing iron as a main component. Namely, when the content of ammoniacal nitrogen in the magnetic acicular alloy particles containing iron as a main component is 30 to 800 ppm and the content of the soluble salts such as the soluble alkali metal salt or the soluble alkali earth metal salt is not more than a specific amount, the difference between the pH values becomes less than 0. On the other hand, when the content of ammoniacal nitrogen in the magnetic acicular alloy particles containing iron as a main component is out of the above-mentioned range and the content of the soluble salts such as the soluble alkali metal salt or the soluble alkali earth metal salt is more than a specific amount, the difference between the pH values becomes not less than 0.

The reason why the difference between the pH values is varied in accordance with the contents of ammoniacal nitrogen and these soluble salts, is considered as follows, though not clearly known yet. That is, the pH value of the water suspension obtained by the boiling method is mainly attributed to only the amount of the soluble salts such as the soluble alkali metal salt, the soluble alkali earth metal salt or the like, because the ammoniacal nitrogen is evaporated and scattered out. On the other hand, the pH value of the water suspension obtained by the ordinary temperature method is attributed to the amount of the ammoniacal nitrogen as well as that of the soluble salts such as the soluble alkali metal salt, the soluble alkali earth metal salt or the like, because the ammoniacal nitrogen is difficult to evaporate and, therefore, still remains therein. Accordingly, by adjusting the contents of both the ammoniacal nitrogen and the soluble salts to appropriate ranges such that the difference between pH values is less than 0, it is possible to obtain the aimed magnetic acicular alloy particles containing iron as a main component according to the present invention, which have various enhanced properties.

Specifically, as shown in Comparative Examples described hereinafter, when the content of the soluble sodium salt is too large even though the content of the ammoniacal nitrogen in the magnetic acicular alloy particles containing iron as a main component falls within the specified range, the pH value of the water suspension treated by the boiling method is equal to or larger than that treated by the ordinary temperature method, so that the difference between the pH values becomes not less than 0. In addition, when the content of the ammoniacal nitrogen does not fall in the specified range even though the content of the soluble salts is small, the pH value of the water suspension treated by the boiling method is larger than that treated by the ordinary temperature method, so that the difference between the pH values also becomes not less than 0. Therefore, these magnetic acicular alloy particles containing iron as a main component cannot exhibit the aimed effects, i.e., various properties thereof cannot be enhanced.

The magnetic acicular alloy particles containing iron as a main component according to the present invention are excellent in dispersibility in vehicle and are improved in orientation and packing density in coating film. Therefore, the magnetic acicular alloy particles containing iron as a main component according to the present invention can be suitably used as high-performance and high-density recording magnetic particles.

Further, the magnetic recording medium using the magnetic acicular alloy particles containing iron as a main component according to the present invention, is not only excellent in gloss, but also can exhibit a high orientation degree and a large saturation flux density (Bm). Therefore, the magnetic recording medium according to the present invention can be suitably used as a high-performance and high-density recording magnetic recording medium.

EXAMPLES

The present invention is described in more detail by Examples and Comparative Examples, but the Examples are only illustrative and, therefore, not intended to limit the scope of the present invention.

Various properties were evaluated by the following methods.

(1) The average major axial diameter and average minor axial diameter of particles are respectively expressed by average values of major axial diameters and minor axial diameters of 300 to 350 particles which were sampled from a photograph obtained by expanding an electron micrograph (×30,000) four times in each of the longitudinal and transverse directions.

(2) The aspect ratio is expressed by a ratio of the average major axial diameter to the average minor axial diameter.

(3) The major axial diameter distribution is expressed by the ratio of a standard deviation to the average major axis diameter.

The standard deviation was obtained by the following equation.

$$s = \sqrt{\sum_{i=1}^{n}(x_1-\overline{x})^2/n}$$

wherein $x_1, x_2, \ldots x_n$ represent the determined major axis diameter of the each specimen, $\overline{x}$ represents an average major axis diameter determined of the each specimen.

(4) The pH values of water suspensions obtained by treating magnetic acicular alloy particles containing iron as a main component by a boiling method and an ordinary temperature method, are expressed by the values measured by a method described in JIS K 5101-1991. Namely, the pH value of each water suspension obtained by treating 5 g of sample particles by the below-described A or B method, was measured according to JIS Z 8802 (pH-measuring method §7.).

A method: 100 ml of water was added to a hard conical flask in which sample particles were placed, and after heating to boiling for approximately 5 minutes, the contents of the flask were boiling for 5 minutes. Water which was previously boiled to remove a carbon dioxide gas therefrom, was added to the flask to compensate a reduced amount (boiling loss) of water. The conical flask was plugged, and the contents of the flask were cooled to room temperature.

B method: 100 ml of water which was previously boiled to remove a carbon dioxide gas therefrom, was added to a hard conical flask in which sample particles were placed, and the flask was plugged and then shaken for 5 minutes, thereby mixing the contents thereof together.

(5) The total content of Na, K, Ca, Mg, Fe, Al, Co and rare earth elements in the particles, is expressed by the value measured as follows. That is, 0.2 g of sample particles were immersed in a 25% aqueous hydrochloric acid solution, and then the mixture was heated and boiled to dissolve the particles therein, thereby obtaining a solution. After cooling the solution to ordinary temperature, pure water was added thereto to prepare 100 cc of a solution. The thus obtained solution was measured using an inductively coupled high-frequency plasma atomic emission spectroscope (SPF-400 Model, manufactured by Seiko Denshi Kogyo Co., Ltd.), thereby obtaining the above total content. The content of each element in soluble salts of Na, K, Ca and Mg is expressed by the value obtained by measuring a water suspension treated by the above boiling method or ordinary temperature method using an inductively coupled high-frequency plasma atomic emission spectroscope (SPF-400 Model, manufactured by Seiko Denshi Kogyo Co., Ltd.). The content of Si in the particles is expressed by the value measured according to "General Rule of Fluorescent X-Ray Analysis" of JIS K 0119 using a fluorescent X-ray diffractometer (3063 M-Model, manufactured by Rigaku Denki Kogyo Co., Ltd.).

(6) The content of ammoniacal nitrogen in magnetic acicular alloy particles containing iron as a main component is expressed by the value measured by an ammonium ion [$NH_4^+$] measuring method described in JIS K 0102-1993, §42. That is, the sample particles were pretreated by a method described in JIS K 0102, §42.1 (distillation method) to separate interfering substances therefrom, and then the amount of ammonium ion was measured by an indophenol blue absorptiometric method described in JIS K 0102-1993, §42.2.

(7) The magnetic properties of magnetic acicular alloy particles containing iron as a main component, is expressed by the value measured using "Vibration Sample-type Magnetometer VSM-3S-15 (manufactured by Toei Kogyo Co., Ltd.) by applying thereto an external magnetic field of up to 10 kOe.

(8) As to the gloss on the surface of coating film, the 45° gloss thereon was measured by a glossmeter UGV-5D (manufactured by Suga Testing Machines Mfg. Co., Ltd.).

Example 1
<Production of Magnetic Spindle Alloy Particles Containing Iron as a Main Component>

First, spindle-shaped goethite particles obtained by washing with pure water and having an average major axial diameter of 0.25 μgm, an aspect ratio (major axial diameter/minor axial diameter) of 13:1 and a major axial diameter distribution of 0.21 (Al content: 8.2 mol %, Co content: 3.5 mol % and Nd content: 1.4 mol %, based on the total content of metal elements (Fe, Al, Co and Nd); and Na content: 950 ppm, Ca content: 151 ppm, Mg content: 135 ppm, K content: 42 ppm based on the total amount of the spindle-shaped goethite particles) were prepared. The spindle-shaped goethite particles were heat-dehydrated in air at 750° C., thereby obtaining spindle-shaped hematite particles. The thus-obtained spindle-shaped hematite particles had an Na content of 1030 ppm, a Ca content of 159 ppm, an Mg content of 158 ppm and a K content of 47 ppm. The spindle-shaped hematite particles were pulverized, deaggregated and washed with pure water, and then successively subjected to filtering, molding and drying. The thus-treated spindle-shaped hematite particles had an Na content of 101 ppm, a Ca content of 155 ppm, an Mg content of 152 ppm and a K content of 16 ppm.

100 g of the obtained spindle-shaped hematite particles having a reduced soluble salt content, were subjected to heat-reduction at a temperature of 450° C. under a hydrogen gas stream until the dew point thereof reached −40° C., thereby producing magnetic spindle-shaped alloy particles containing iron as a main component, which contain Al, Co and Nd. After completion of the heat-reduction, the hydrogen gas stream was replaced with a nitrogen gas stream, and then the magnetic spindle-shaped alloy particles were cooled to 70° C.

Next, while controlling the gas temperature at 70° C., a mixed gas having an oxygen gas concentration of 0.450% (air) and a water-vapor concentration of 0.367% based on 35 liters of the nitrogen gas, was passed through the magnetic spindle-shaped alloy particles, thereby forming an oxide layer on the surfaces of the particles. Further, an ammonia gas whose concentration in the mixed gas was adjusted to 0.024%, was introduced and contacted with the magnetic spindle-shaped alloy particles.

When the temperature of the magnetic spindle-shaped alloy particles was increased to 145° C. at which the heat-generation was terminated, the gas temperature was cooled to room temperature during which the supply of the mixed gas was continued.

The thus obtained magnetic spindle-shaped alloy particles containing iron as a main component, which contain Al, Co and Nd, had an average major axial diameter of 0.18 μm, an aspect ratio of 8:1, a major axial diameter distribution of 0.28, a coercive force of 1,590 Oe and a saturation magnetization value of 131 emu/g. The pH value of the magnetic spindle-shaped alloy particles was 9.8 when treated by the above boiling method (A method), and was 10 when treated by the ordinary temperature method (B method). As a result, it was confirmed that the difference between the pH values was −0.2. Further, the magnetic spindle-shaped alloy particles containing iron as a main component, which contain Al, Co and Nd, had an Al content of 8.0 mol %, a Co content of 3.4 mol % and an Nd content of 1.3 mol % based on the total content of metal elements (Fe, Al, Co and Nd) in the particles, and further had an Na content of 145 ppm (soluble Na content: 143 ppm in the case of the boiling method, and 110 ppm in the case of the ordinary temperature method), a K content of 22 ppm (soluble K content: 20 ppm in the case of the boiling method, and 19 ppm in the case of the ordinary temperature method), a Ca content of 202 ppm (soluble Ca content: 65 ppm in the case of the boiling method, and 8 ppm in the case of the ordinary temperature method) and an Mg content of 196 ppm (soluble Mg content: 5 ppm in the case of the boiling method, and 3 ppm in the case of the ordinary temperature method) based on the magnetic spindle-shaped alloy particles containing iron as a main component, which contain Al, Co and Nd. The total amount of the soluble salts was 233 ppm. The ammoniacal nitrogen content of the magnetic spindle-shaped alloy particles was 290 ppm.

Example 2
<Production of Magnetic Recording Medium>

12 g of the magnetic spindle-shaped alloy particles containing iron as a main component, which were obtained in Example 1, 1.2 g of an abrasive (tradename: AKP-50, produced by Sumitomo Chemical Co., Ltd.), 0.24 g of carbon black (tradename: #2400B, produced by Mitsubishi Chemical Corp.), a binder resin solution (composed of 30% by weight of a vinyl chloride-vinyl acetate copolymer resin having a sodium sulfonate group and 70% by weight of cyclohexanone) and cyclohexanone were mixed together. The obtained mixture (solid content: 78%) was further kneaded by a plastomill for 30 minutes, thereby obtaining a kneaded material.

The thus obtained kneaded material was charged into a 140-ml glass bottle together with 95 g of 1.5 mmϕ glass beads, a binder resin solution (composed of 30% by weight of a polyurethane resin having a sodium sulfonate group and 70% by weight of a mixed solvent (methyl ethyl ketone:toluene=1:1)), cyclohexanone, methyl ethyl ketone and toluene. The mixture was mixed and dispersed together for 6 hours using a paint shaker. Further, a lubricant and a curing agent were added to the resultant mixture, and the obtained mixture was mixed and dispersed together for 15 minutes using a paint shaker, thereby obtaining a magnetic coating material.

The thus obtained magnetic coating material had the following composition:

| | |
|---|---|
| Magnetic spindle-shaped alloy particles containing iron as a main component | 100 parts by weight |
| Vinyl chloride-vinyl acetate copolymer resin having a sodium sulfonate group | 10 parts by weight |
| Polyurethane resin having a sodium sulfonate group | 10 parts by weight |
| Abrasive (AKP-30) | 10 parts by weight |
| Carbon black (#3250B) | 2.0 parts by weight |
| Lubricant (myristic acid:butyl stearate = 1:2) | 3.0 parts by weight |
| Curing agent (polyisocyanate) | 5.0 parts by weight |
| Cyclohexanone | 65.3 parts by weight |
| Methyl ethyl ketone | 163.3 parts by weight |
| Toluene | 98.0 parts by weight |

The magnetic coating material was applied on a 12 μm-thick polyethylene terephthalate film using an applicator to form a coating layer having a thickness of 15 μm. Thereafter, the film was oriented and dried in the magnetic field, and then subjected to calender treatment. Then, the coating layer was subjected to curing reaction at 60° C. for 24 hours and the film was slit into 5-inch width, thereby obtaining a magnetic tape. The thickness of the obtained magnetic layer was 1.0 μm.

The obtained magnetic tape had a gloss of 200%, a squareness (Br/Bm) of 0.900, a remanence flux density value (Br) of 3,120 Gauss and a coercive force value (Hc) of 1,520 Oe.

Examples 3 to 9 and Comparative Examples 1 to 7

The same procedure as defined in Example 1 was conducted except that various starting materials having different compositions, soluble alkali metal salt content, soluble alkali earth metal salt content and soluble salt contents, were used, and conditions of heat-reduction, gradual oxidation and the like were varied, thereby obtaining various magnetic acicular alloy particles containing iron as a main component having different compositions, soluble alkali metal salt content, soluble alkali earth metal salt content and soluble salt contents.

The thus obtained magnetic acicular alloy particles containing iron as a main component are shown in Tables 1 and 2.

Incidentally, the magnetic acicular alloy particles containing iron as a main component which were obtained in Comparative Example 6, were particles produced in the same manner as in Example 1 except that the spindle-shaped hematite particles were immediately subjected to reduction reaction without washing with pure water; after replacing hydrogen gas with ammonia gas, the obtained particles were treated with ammonia gas at 250° C. for one hour; and then the obtained particles were gradually oxidized with a mixed gas composed of nitrogen and oxygen (air) when the temperature of the particles reached 70° C. As shown in Table 2, the magnetic acicular alloy particles containing iron as a main component which were obtained in Comparative Example 6, had an ammoniacal nitrogen content of 0 ppm. As a result, it was recognized that in the case where the particles were contacted with the ammonia gas at a temperature as high as 250° C., the ammoniacal nitrogen could not be effectively introduced into the particles.

In addition, the magnetic acicular alloy particles containing iron as a main component which were obtained in Comparative Example 7, were particles produced in the same manner as in Example 1 except that the spindle-shaped -hematite particles were immediately subjected to reduction reaction without washing with pure water; the obtained particles were gradually oxidized with a mixed gas composed of nitrogen and oxygen (air) when the temperature of the particles reached 70° C.; the particles were heated to 100° C. under a nitrogen gas stream and treated with a mixed gas composed of ammonia gas and nitrogen for one hour; and then the obtained particles were further heated to 250° C. under a nitrogen stream and treated with the mixed gas composed of ammonia gas and nitrogen for one hour (i.e., the method described in Japanese Patent Application Laid-Open (KOKAI) No. 63-88806 (1989)). As shown in Table 2, the magnetic acicular alloy particles containing iron as a main component which were obtained in Comparative Example 7, had an ammoniacal nitrogen content of 25 ppm. As a result, it was also recognized that in the case where the particles were contacted with the ammonia gas and then treated under a nitrogen stream, the ammoniacal nitrogen could not effectively introduced into the particles.

Examples 10 to 18 and Comparative Examples 8 to 15

The same procedure as defined in Example 2 was conducted except that kinds of magnetic acicular alloy particles containing iron as a main component and kinds of functional groups of binder resins were varied, thereby obtaining magnetic recording media.

Various properties of the obtained magnetic recording media are shown in Table 3.

TABLE 1

| Examples and Comparative Examples | Magnetic acicular alloy particles containing iron as a main component | | | |
|---|---|---|---|---|
| | Composition (mol %) based on Fe, Al, Co, rare earth and Si | | | |
| | Al (mol %) | Co (mol %) | Rare earth element (mol %) | Other element (mol %) |
| Example 3 | 8.1 | 3.4 | Nd: 2.2 | — |
| Example 4 | 8.0 | 3.4 | La: 2.2 | — |
| Example 5 | 5.4 | 7.9 | Nd: 4.5 | — |
| Example 6 | 10.6 | 26.3 | Y: 7.1 | — |
| Example 7 | 10.6 | 4.4 | — | — |
| Example 8 | — | 2.6 | Nd: 2.7 | Si: 2.7 |
| Example 9 | 8.0 | 3.5 | Nd: 1.3 | — |
| Comparative Example 1 | 8.0 | 3.4 | Nd: 2.2 | — |
| Comparative Example 2 | 8.1 | 3.4 | Nd: 2.2 | — |
| Comparative Example 3 | 8.1 | 3.4 | Nd: 2.2 | — |
| Comparative Example 4 | 8.1 | 3.4 | Nd: 2.1 | — |
| Comparative Example 5 | 8.0 | 3.4 | Nd: 2.2 | — |
| Comparative Example 6 | 8.0 | 3.4 | Nd: 2.2 | — |
| Comparative Example 7 | 8.0 | 3.4 | Nd: 2.2 | — |

TABLE 1-continued

| Examples and Comparative Examples | Average major axial diameter (μm) | Aspect ratio |
|---|---|---|
| Example 3 | 0.17 | 10:1 |
| Example 4 | 0.15 | 9:1 |
| Example 5 | 0.11 | 8:1 |
| Example 6 | 0.09 | 6:1 |
| Example 7 | 0.18 | 10:1 |
| Example 8 | 0.19 | 9:1 |
| Example 9 | 0.18 | 9:1 |
| Comparative Example 1 | 0.17 | 10:1 |
| Comparative Example 2 | 0.15 | 8:1 |
| Comparative Example 3 | 0.18 | 8:1 |
| Comparative Example 4 | 0.17 | 10:1 |
| Comparative Example 5 | 0.17 | 10:1 |
| Comparative Example 6 | 0.18 | 7:1 |
| Comparative Example 7 | 0.17 | 8:1 |

| Examples and Comparative Examples | Major axial diameter distribution | Particle shape |
|---|---|---|
| Example 3 | 0.23 | Spindle-shaped |
| Example 4 | 0.23 | Spindle-shaped |
| Example 5 | 0.22 | Spindle-shaped |
| Example 6 | 0.21 | Spindle-shaped |
| Example 7 | 0.29 | Spindle-shaped |
| Example 8 | 0.34 | Spindle-shaped |
| Example 9 | 0.48 | Acicular |
| Comparative Example 1 | 0.28 | Spindle-shaped |
| Comparative Example 2 | 0.33 | Spindle-shaped |
| Comparative Example 3 | 0.37 | Spindle-shaped |
| Comparative Example 4 | 0.33 | Spindle-shaped |
| Comparative Example 5 | 0.34 | Spindle-shaped |
| Comparative Example 6 | 0.45 | Spindle-shaped |
| Comparative Example 7 | 0.36 | Spindle-shaped |

TABLE 2

| Examples and Comparative Examples | Magnetic acicular alloy particles containing iron as a main component | | |
|---|---|---|---|
| | pH | | |
| | Boiling method | Ordinary temperature method | Difference between pH values |
| Example 3 | 9.8 | 10.1 | −0.3 |
| Example 4 | 10.0 | 10.2 | −0.2 |

TABLE 2-continued

| Examples and Comparative Examples | Magnetic acicular alloy particles containing iron as a main component | | |
|---|---|---|---|
| Example 5 | 9.8 | 10.1 | −0.3 |
| Example 6 | 9.8 | 10.0 | −0.2 |
| Example 7 | 10.2 | 10.7 | −0.5 |
| Example 8 | 9.1 | 9.2 | −0.1 |
| Example 9 | 10.5 | 10.3 | −0.2 |
| Comparative Example 1 | 9.7 | 9.6 | +0.1 |
| Comparative Example 2 | 10.3 | 10.0 | +0.3 |
| Comparative Example 3 | 10.8 | 10.3 | +0.5 |
| Comparative Example 4 | 10.3 | 10.1 | +0.2 |
| Comparative Example 5 | 10.5 | 10.4 | +0.1 |
| Comparative Example 6 | 10.3 | 10.2 | +0.1 |
| Comparative Example 7 | 10.1 | 10.1 | 0.0 |

| | Soluble alkali metal salt | | | |
|---|---|---|---|---|
| | Soluble Na | | Soluble K | |
| | Boiling method | Ordinary temperature method | Boiling method | Ordinary temperature method |
| Example 3 | 146 | 112 | 21 | 19 |
| Example 4 | 258 | 190 | 15 | 13 |
| Example 5 | 87 | 69 | 8 | 5 |
| Example 6 | 318 | 240 | 2 | 2 |
| Example 7 | 390 | 300 | 23 | 19 |
| Example 8 | 120 | 91 | 19 | 16 |
| Example 9 | 100 | 75 | 21 | 19 |
| Comparative Example 1 | 154 | 109 | 19 | 17 |
| Comparative Example 2 | 750 | 589 | 43 | 36 |
| Comparative Example 3 | 1,500 | 1,235 | 58 | 49 |
| Comparative Example 4 | 900 | 786 | 31 | 25 |
| Comparative Example 5 | 765 | 621 | 2 | 1 |
| Comparative Example 6 | 1,589 | 1,301 | 67 | 61 |
| Comparative Example 7 | 1,527 | 1,258 | 59 | 44 |

| | Soluble alkali metal salt | | | |
|---|---|---|---|---|
| | Soluble Ca | | Soluble Mg | |
| | Boiling method | Ordinary temperature method | Boiling method | Ordinary temperature method |
| Example 3 | 6 | 1 | 4 | 2 |
| Example 4 | 13 | 2 | 5 | 2 |
| Example 5 | 78 | 18 | 3 | 1 |
| Example 6 | 40 | 7 | 2 | 1 |
| Example 7 | 90 | 29 | 6 | 3 |
| Example 8 | 12 | 2 | 5 | 3 |
| Example 9 | 70 | 7 | 4 | 3 |
| Comparative Example 1 | 6 | 2 | 4 | 2 |
| Comparative Example 2 | 290 | 56 | 396 | 197 |
| Comparative Example 3 | 1,687 | 369 | 123 | 52 |

TABLE 2-continued

| Examples and Comparative Examples | Magnetic acicular alloy particles containing iron as a main component | | | |
|---|---|---|---|---|
| Comparative Example 4 | 40 | 3 | 122 | 46 |
| Comparative Example 5 | 50 | 4 | 300 | 161 |
| Comparative Example 6 | 71 | 7 | 5 | 2 |
| Comparative Example 7 | 64 | 5 | 4 | 2 |

| | Total content of soluble salts | Ammoniacal nitrogen (ppm) | Coercive force Hc (Oe) | Saturation magnetization (emu/g) |
|---|---|---|---|---|
| Example 3 | 177 | 300 | 1,680 | 135 |
| Example 4 | 291 | 165 | 1,850 | 128 |
| Example 5 | 176 | 405 | 1,920 | 142 |
| Example 6 | 362 | 90 | 2,200 | 139 |
| Example 7 | 509 | 755 | 1,550 | 126 |
| Example 8 | 156 | 205 | 1,710 | 131 |
| Example 9 | 195 | 260 | 1,780 | 134 |
| Comparative Example 1 | 183 | 0 | 1,690 | 134 |
| Comparative Example 2 | 1,479 | 0 | 1,800 | 129 |
| Comparative Example 3 | 3,368 | 0 | 1,570 | 133 |
| Comparative Example 4 | 1,093 | 310 | 1,660 | 135 |
| Comparative Example 5 | 1,117 | 1,500 | 1,650 | 134 |
| Comparative Example 6 | 1,732 | 0 | 880 | 101 |
| Comparative Example 7 | 1,654 | 25 | 1,510 | 122 |

TABLE 3

| Examples and Comparative Examples | Magnetic recording medium | | |
|---|---|---|---|
| | Kind of resin (functional group) | Kind of magnetic particles | Gloss (%) |
| Example 10 | -SO$_3$Na | Example 3 | 202 |
| Example 11 | -SO$_3$Na | Example 4 | 200 |
| Example 12 | -SO$_3$Na | Example 5 | 220 |
| Example 13 | -SO$_3$Na | Example 6 | 207 |
| Example 14 | -SO$_3$Na | Example 7 | 188 |
| Example 15 | -SO$_3$Na | Example 8 | 177 |
| Example 16 | -COOH | Example 3 | 196 |
| Example 17 | -OH | Example 3 | 180 |
| Example 18 | -SO$_3$Na | Example 9 | 172 |
| Comparative Example 8 | -SO$_3$Na | Comparative Example 1 | 150 |
| Comparative Example 9 | -SO$_3$Na | Comparative Example 2 | 140 |
| Comparative Example 10 | -SO$_3$Na | Comparative Example 3 | 128 |
| Comparative Example 11 | -SO$_3$Na | Comparative Example 4 | 140 |
| Comparative Example 12 | -SO$_3$Na | Comparative Example 5 | 147 |
| Comparative Example 13 | -SO$_3$Na | Comparative Example 6 | 118 |

TABLE 3-continued

| Examples and Comparative Examples | | | |
|---|---|---|---|
| Comparative Example 14 | -SO$_3$Na | Comparative Example 7 | 148 |
| Comparative Example 15 | -OH | Comparative Example 1 | 141 |

| | Magnetic recording medium | | |
|---|---|---|---|
| | Squareness | Remanence flux density (Br) (Gauss) | Coercive force Hc (Oe) |
| Example 10 | 0.915 | 3,200 | 1,620 |
| Example 11 | 0.908 | 3,210 | 1,840 |
| Example 12 | 0.918 | 3,280 | 2,050 |
| Example 13 | 0.907 | 3,300 | 2,310 |
| Example 14 | 0.883 | 2,920 | 1,480 |
| Example 15 | 0.870 | 3,150 | 1,690 |
| Example 16 | 0.900 | 3,210 | 1,600 |
| Example 17 | 0.879 | 2,990 | 1,580 |
| Example 18 | 0.875 | 3,150 | 1,640 |
| Comparative Example 8 | 0.859 | 2,650 | 1,610 |
| Comparative Example 9 | 0.844 | 2,390 | 1,800 |
| Comparative Example 10 | 0.837 | 2,420 | 1,510 |
| Comparative Example 11 | 0.853 | 2,570 | 1,600 |
| Comparative Example 12 | 0.853 | 2,520 | 1,600 |
| Comparative Example 13 | 0.800 | 1,800 | 710 |
| Comparative Example 14 | 0.820 | 2,740 | 1,410 |
| Comparative Example 15 | 0.851 | 2,500 | 1,590 |

What is claimed is:

1. Magnetic acicular alloy particles containing iron as a main component, which have an average major axial diameter of 0.05 to 0.2 μm, an ammoniacal nitrogen content of 30 to 800 ppm based on said magnetic acicular alloy particles containing iron as a main component, soluble salts of not more than 800 ppm based on said magnetic acicular alloy particles containing iron as a main component and pH values of water suspensions of said magnetic acicular alloy particles containing iron as a main component, which satisfies the formula:

(pH value of water suspension treated by A method)–(pH value of water suspension treated by B method)<0 wherein said A method comprises:
   placing 5 g of said magnetic acicular alloy particles in a hard conical flask;
   adding 100 ml of water into the flask;
   after heating to boiling for approximately 5 minutes, boiling the contents of the flask for 5 minutes;
   compensating a reduced amount of water in the flask by adding thereto water which is previously boiled to remove a carbon dioxide gas therefrom; and
   after plugging the flask, allowing the contents of the flask to stand for cooling to room temperature,
said B method comprises:
   placing 5 g of said magnetic acicular alloy particles in a hard conical flask;
   adding 100 ml of water which is previously boiled to remove a carbon dioxide gas therefrom, into the flask; and
   after plugging the flask, shaking the contents of the flask for 5 minutes,
wherein the pH values of the respective water suspensions treated by said A and B methods are measured by a pH meter.

2. Magnetic acicular alloy particles containing iron as a main component according to claim 1, wherein the content of a soluble alkali metal salt is not more than 500 ppm based on said magnetic acicular alloy particles containing iron as a main component.

3. Magnetic acicular alloy particles containing iron as a main component according to claim 1, wherein the content of a soluble alkali earth metal salt is not more than 300 ppm based on said magnetic acicular alloy particles containing iron as a main component.

4. Magnetic acicular alloy particles containing iron as a main component according to claim 1, which further have an aspect ratio of 3:1 to 20:1, a coercive force value of 1,400 to 2,500 Oe and a saturation magnetization value of 100 to 170 emu/g.

5. Magnetic acicular alloy particles containing iron as a main component according to claim 1, wherein a soluble alkali metal salt is present in an amount of not more than 500 ppm, and a soluble alkali earth metal salt is present in an amount not more than 300 ppm based on said magnetic acicular alloy particles containing iron as a main component.

6. Magnetic acicular alloy particles containing iron as a main component according to claim 1, further containing at least one element selected from the group consisting of Al, Co, Ni, P, Si, B and rare earth elements.

7. Magnetic acicular alloy particles containing iron as a main component according to claim 6, wherein the content of iron is 50 to 95% by weight.

8. Magnetic acicular alloy particles containing iron as a main component according to claim 6, wherein at least one of the elements contained is Al in a content range of 0.1 to 30 mol % based on the total content of metal elements in said magnetic acicular alloy particles containing iron as a main component.

9. Magnetic acicular alloy particles containing iron as a main component according to claim 6, wherein at least one of the elements contained is Co in a content range of 0.5 to 35 mol % based on the total content of metal elements in said magnetic acicular alloy particles containing iron as a main component.

10. Magnetic acicular alloy particles containing iron as a main component according to claim 6, wherein at least one of the elements contained is a rare earth element in a content range of 0.1 to 10 mol % based on the total content of metal elements in said magnetic acicular alloy particles containing iron as a main component.

11. Magnetic acicular alloy particles containing iron as a main component, which have an average major axial diameter of 0.05 to 0.2 μm, an ammoniacal nitrogen content of 30 to 800 ppm based on said magnetic acicular alloy particles containing iron as a main component, a soluble alkali metal salt of not more than 500 ppm based on said magnetic acicular alloy particles containing iron as a main component, a soluble alkali earth metal salt of not more than 300 ppm based on said magnetic acicular alloy particles containing iron as a main component, and pH values of water suspensions of said magnetic acicular alloy particles containing iron as a main component, which satisfies the formula:

(pH value of water suspension treated by A method)–(pH value of water suspension treated by B method)<0 wherein said A method comprises:

placing 5 g of said magnetic acicular alloy particles in a hard conical flask;

adding 100 ml of water into the flask;

after heating to boiling for approximately 5 minutes, boiling the contents of the flask for 5 minutes;

compensating a reduced amount of water in the flask by adding thereto water which is previously boiled to remove a carbon dioxide gas therefrom; and after plugging the flask, allowing the contents of the flask to stand for cooling to room temperature, said B method comprises:

placing 5 g of said magnetic acicular alloy particles in a hard conical flask;

adding 100 ml of water which is previously boiled to remove a carbon dioxide gas therefrom, into the flask; and after plugging the flask, shaking the contents of the flask for 5 minutes, wherein the pH values of the respective water suspensions treated by said A and B methods are measured by a pH meter.

12. Magnetic acicular alloy particles containing iron as a main component and at least one element selected from the group consisting of Al, Co, Ni, P, Si, B and rare earth elements, wherein said magnetic acicular alloy particles satisfy at least one condition: (A) the Al content is 0.1 to 30 mol % based on the total content of metal elements in said magnetic acicular alloy particles containing iron as a main component, (B) the Co content is 0.5 to 35 mol % based on the total content of metal elements in said magnetic acicular alloy particles containing iron as a main component, and (C) the rare earth element content is 0.1 to 10 mol % based on the total content of metal elements in said magnetic acicular alloy particles containing iron as a main component, which have an average major axial diameter of 0.05 to 0.2 $\mu$m, an ammoniacal nitrogen, of 30 to 800 ppm based on said magnetic acicular alloy particles containing iron as a main component, soluble salts of not more than 800 ppm based on said magnetic acicular alloy particles containing iron as a main component and pH values of water suspensions of said magnetic acicular alloy particles containing iron as a main component, and which satisfies the formula:

(pH value of water suspension treated by A method)−(pH value of water suspension treated by B method)<0 wherein said A method comprises:

placing 5 g of said magnetic acicular alloy particles in a hard conical flask;

adding 100 ml of water into the flask;

after heating to boiling for approximately 5 minutes, boiling the contents of the flask for 5 minutes;

compensating a reduced amount of water in the flask by adding thereto water which is previously boiled to remove a carbon dioxide gas therefrom; and after plugging the flask, allowing the contents of the flask to stand for cooling to room temperature, said B method comprises:

placing 5 g of said magnetic acicular alloy particles in a hard conical flask;

adding 100 ml of water which is previously boiled to remove a carbon dioxide gas therefrom, into the flask; and after plugging the flask, shaking the contents of the flask for 5 minutes, wherein the pH values of the respective water suspensions treated by said A and B methods are measured by a pH meter.

* * * * *